Jan. 9, 1951 R. RASPET 2,537,088
SENSITIVE INSTRUMENT BEARING
Filed March 10, 1948
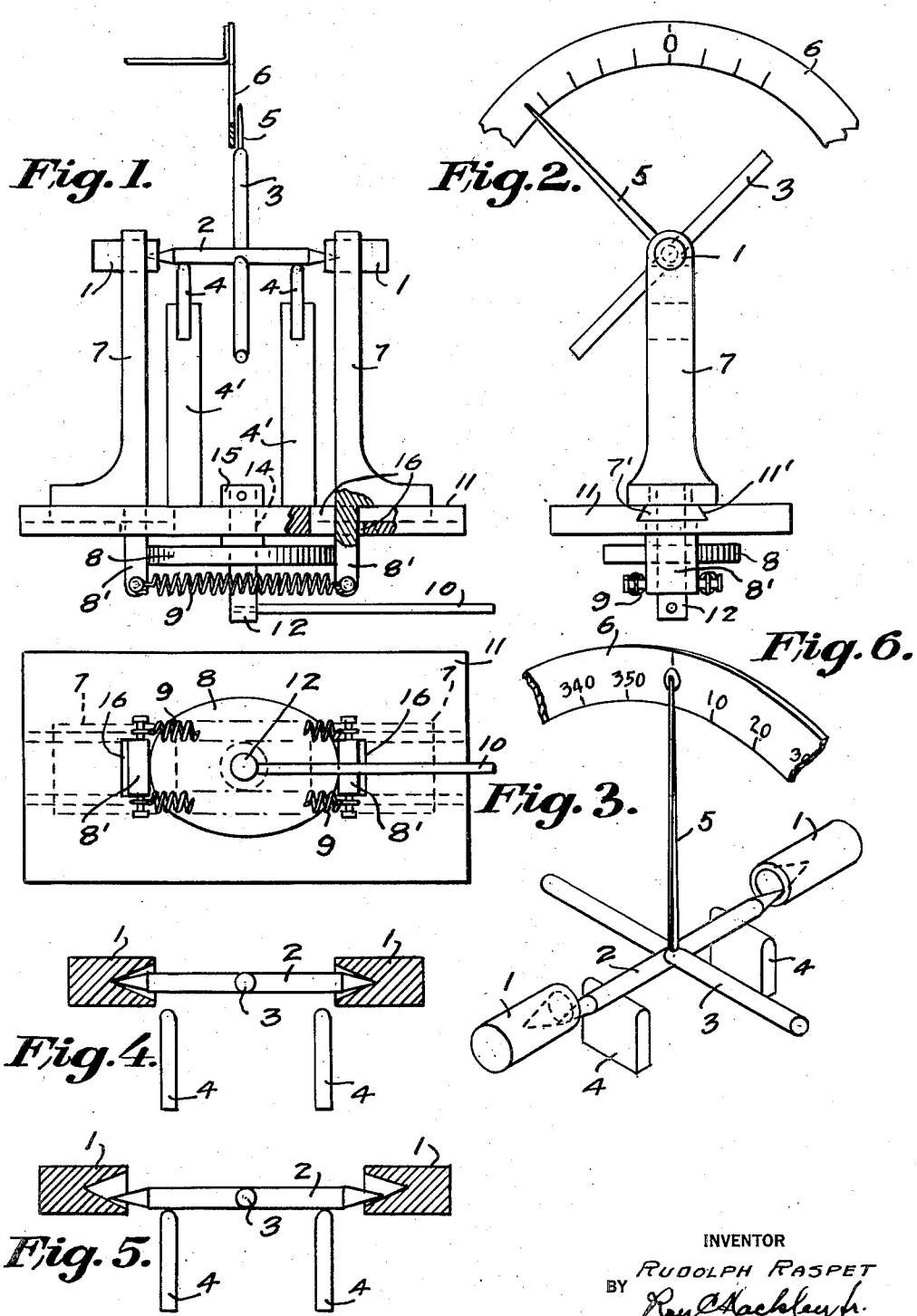
INVENTOR
RUDOLPH RASPET
BY
ATTORNEY Patented Jan. 9, 1951

2,537,088

UNITED STATES PATENT OFFICE 2,537,088

SENSITIVE INSTRUMENT BEARING

Rudolph Raspet, Baltimore, Md.

Application March 10, 1948, Serial No. 14,140

8 Claims. (Cl. 308—2)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to an improved bearing for sensitive instruments.

In sensitive instruments such as magnetometers, leveling devices, and the like, it is essential for accuracy that the bearings which pivot the shaft holding the indicating needle be as free from friction as possible.

The torque which moves the indicating needle and its shaft on any measuring instrument approaches zero as the needle approaches its true reading. Any friction in the shaft bearing will cause the needle to stop short of a true reading because the slight torque existing cannot overcome the frictional drag. The problem is aggravated when the needle shaft must bear a relatively heavy load since larger bearings are usually less free of friction. All needles generally oscillate to a final position of equilibrium, when such oscillations become small the residual action forces are also small and the friction is of the same order of magnitude. By eliminating or substantially reducing the nature of this last motion to one of rolling instead of sliding, it is possible to measure much more accurately.

The knife edge bearing, or cylinder rolling on another set of cylinders, has the advantage that it pivots relatively heavy loads with relatively little friction. However, the knife edge or rolling cylinder is well adapted for use only where the indicating needle swings through an arc of a few degrees. The knife edge will not permit a greater arc and the rolling cylinder, if it rolls through more than a few degrees, displaces the axis of the needle from the center of the scale and results in an inaccurate indication. Moreover, the instrument mechanism usually cannot tolerate movement of the needle axis. Reducing the diameter of the shaft helps eliminate this defect but the amount of reduction of the shaft diameter is limited by the load the shaft must carry.

Conical bearings allow any degree of rotation of the shaft and needle. However, such bearings impose a relatively high frictional drag on the shaft causing the needle to stop short of a true reading and introducing inaccuracies.

It is an object of this invention to provide a sensitive instrument bearing permitting 360 degrees of rotation with low frictional drag.

It is also an object of this invention to provide a pivoted shaft so arranged that it may be pivoted alternately by either of two types of bearings.

It is a further object of this invention to provide means whereby a shaft may be pivoted by journal-type bearings during the initial part of its rotation and by a knife-edge type bearing during the final part of the rotation.

Other objects and advantages will occur to those skilled in the art from consideration of the following specification taken in connection with the drawings in which—

Fig. 1 is a side elevation view of an instrument embodying the principles of this invention.

Fig. 2 is a front elevation view of the instrument shown in Fig. 1.

Fig. 3 is a bottom plan view of the instrument of Fig. 1.

Figs. 4 and 5 are partial elevational sectional views of a shaft and bearings illustrating the principles of operation of this invention.

Fig. 6 is a perspective view of a shaft and bearings illustrating the principles of operation of this invention.

As best seen in Figs. 1 and 2, a base 11 has running transversely thereof two dovetailed grooves 11', in each of which slides a correspondingly shaped member 7' fixed to or made integral with the bottoms of each of bearing support members 7. Each member 7 supports a concave conical bearing member 1 so that the concave conical ends thereof oppose one another.

Shaft 2 has convex conical ends, each of which is journaled in one of said concave conical bearing members. Shaft 2 has fixed thereto an indicating needle 5 arranged to swing before a scale 6. Shaft 2 also has fixed thereto means 3 for rotating said shaft in accordance with some force to be measured. In Figs. 1 and 2 the means 3 might be a bar magnet or magnets fixed to shaft 2 so that needle 5 would, for example, indicate the dip of magnetic force at right angles to the shaft 2.

Under shaft 2 and extending at right angles thereto are two spaced bearing members 4, each being positioned adjacent one end of the shaft 2. Bearing members 4 have an upper cylindrical surface, the elements of which are straight and upon which shaft 2 is adapted to roll when lowered thereon. Each bearing member 4 is supported by a column 4' which is fixed to base 11.

Also depending from the bottom of each of bearing support members 7 is a cam follower 8'. Two springs 9 in tension are connected between cam followers 8'—8', thereby urging to slidably move together in grooves 11'—11' bearing support members 7—7 and bearing members 1—1. Each cam follower 8' protrudes through base 11 through holes 16, best seen in Fig. 3. Holes 16 are shaped to allow a short movement of cam followers 8' as support members 7 move transversely of base member 11 in slots 11'.

Between cam followers 8' and 8' is an oval cam 8 against which said cam followers ride. Cam 8 is fixed to a pin 12 rotatably mounted in a hole 14 in base 11. Pin 12 is maintained in position by a collar 15 fastened to the upper end of pin 12, where it protrudes through hole 14. Hole 14 and the part of pin 12 extending therethrough is of smaller diameter than the lower part of pin 12 and the shoulder formed by the reduction in diameter of pin 12 and the collar 15 prohibit undue axial movement of pin 12. A lever 10 is fixed to the bottom end of pin 12.

In the operation of the device shown in Figs. 1 to 3, the lever 10 is normally in a position at right angles to that shown in Fig. 3 so that the minor axis of cam 8 is between cam followers 8'—8' allowing springs 9—9 to urge cam followers 8'—8', and also bearing members 1—1, to their position of extreme proximity. In this position, as best seen in Fig. 4, bearing members 1—1 journal the conical ends of shaft 2 and hold said shaft for free rotation about the axis of bearing members 1, which is termed herein the normal axis of shaft 2. Cylindrical bearing members 4—4 are shown under shaft 2. In the position shown in Fig. 4 it will be obvious that shaft 2 is capable of 360, or more, degrees rotation continuously in one direction.

When lever 10 is turned through 90 degrees to occupy the position shown in Fig. 3, the major axis of cam 8 is inserted between cam followers 8'—8' and the cam followers are moved away from each other with a resulting widening of the distance between bearing members 1—1. As the bearing members 1—1 draw apart, the convex conical ends on the shaft 2 slide down the concave interior surface of bearing member 1—1 until the shaft 2 rests on cylindrical bearing members 4—4. This condition is shown in Fig. 5. It will be seen that the distance that the shaft 2 drops from its normal axis until it rests on bearing members 4—4 is less than the radius of the concave conical surfaces of bearing members 1—1, so that when bearing members 1—1 are moved together the camming action of the concave surfaces of bearing members 1—1 on the convex conical tips of shaft 2 restores shaft 2 to its normal axis in alignment with the axes of the conical surfaces in bearing members 1—1.

It will also be seen that when bearing members 1—1 are in their extreme outermost position the apexes of the convex conical tips of shaft 2 are within the cones formed by the inner surfaces of bearing members 1—1. Thus the bearing members 1—1 serve to protect the convex conical tips on shaft 2 at all times and place a limit on the extreme distance to which the shaft 2 can roll when it is resting on cylindrical members 4—4, as shown in Fig. 5. In the condition shown in Fig. 5 no part of shaft 2 is in contact with bearings 1—1 and shaft 2 is supported wholly by a rolling contact with cylindrical bearing members 4—4. This condition is also shown in perspective in Fig. 6.

There is provided by this invention an arrangement whereby an instrument shaft is normally held in conical pivots with a fixed axis capable of rotation through 360 degrees, or to an amount not restricted by the pivoting arrangement. When the shaft is in the conical pivots, as shown in Fig. 4, the needle will swing about an axis fixed with respect to the scale. When the needle 5 has reached the end of its movement with the shaft 2 held in the conical bearings 1—1, the torque rotating shaft 2 is no longer adequate to rotate the shaft against the friction of the bearings 1—1. At this point cam 8 is rotated by lever 10 to widen the distance between bearings 1—1, as shown in Fig. 5, and allow shaft 2 to gently drop upon cylindrical bearing members 4—4.

In this condition there is a greatly reduced frictional drag against rotation and the torque on shaft 2 is now able to rotate the shaft through the very slight angular distance to cause the needle 5 to give a true reading. The shaft 2 may be made of adequate diameter to support a relatively heavy load. The shaft 2 is preferably made of highly polished, hardened steel, or sapphire, as are the cylindrical members 4—4. The bearing members 1—1 are preferably made of V-jewels, or of metal with V-jewels inserted therein. It will be obvious that the concave bearing members could be placed at the ends of shaft 2 with the convex conical members being made movable and supported by the bearing supports 7—7. It will also be understood that the legs or other support (not shown) for base 11 will be constructed so as not to impede a 90-degree swing of handle 10.

The embodiment of this invention described herein is by way of example only and many modifications and changes will occur to those skilled in the art within the scope of the appended claims.

What is claimed is:

1. A shaft having bearing means on its ends, two spaced bearing means movable in a direction parallel to said shaft, at least one bearing element under said shaft on which the shaft is adapted to roll, said bearing element extending substantially at right angles to the axis of said shaft, means for moving said movable bearing means together to support said shaft for free rotation and means to separate said movable bearing means to allow said shaft to roll on said element, means to raise said shaft into alignment with said movable bearing means as said movable bearing means are moved together and means to lower said shaft to said bearing element as said movable bearing means are moved apart.

2. A shaft having bearing means on each of its two ends constituting a first pair of bearing means, two spaced movable bearing means constituting a second pair of bearing means, one of said pairs of bearing means being concave and one of said pairs of bearing means being convex, said movable bearing means having an axis coinciding with the normal axis of said shaft, at least one bearing element under said shaft and extending substantially at right angles thereto, upon which said shaft is adapted to roll, means for moving said movable bearing means toward each other along said normal axis so that the concave bearing means receive the convex bearing means to support the shaft for free rotation, said means for moving also being for moving said movable bearing apart to allow the shaft to be lowered from its normal axis to roll on said bearing element.

3. The combination of claim 2, in which said convex means and concave means are conical.

4. The combination of claim 2, in which the shaft carries an indicating needle arranged to rotate before a calibrated scale.

5. The combination of claim 2, in which the shaft carries indicating means and means for applying a torque to said shaft to cause it to rotate.

6. The combination of claim 2, in which said convex and concave means, by a camming action therebetween, lower said shaft from its normal axis to roll on said element when the movable bearing means are moved apart and raise said shaft back to its normal axis when said movable bearing means are moved together.

7. The combination of claim 2, in which the shaft bearing means are conical and convex and the movable bearing means are conical and concave.

8. The combination of claim 2, in which the extreme outer position to which the movable bearing means are movable leaves the apex of the convex bearing means within the concave bearing means so that the movement of said shaft will be restricted by said second bearing means when said movable bearing means are in said outer position and said shaft rolls on said bearing element.

RUDOLPH RASPET.

REFERENCES CITED

The following references are of record in the file of this patent:

UNITED STATES PATENTS

| Number | Name | Date |
|---|---|---|
| 823,184 | Johnson | June 1, 1909 |
| 1,447,587 | Calvert | Mar. 6, 1923 |